United States Patent
Tamian et al.

[19]

[11] Patent Number: 6,145,288
[45] Date of Patent: Nov. 14, 2000

[54] DEVICE FOR CREATING FLUID TREATED MULCH

[76] Inventors: Richard Tamian; Christala Tamian, both of 69 Edison Ter.; Donald Duffy, 62 Edison Ter., all of Sparta, N.J. 07871

[21] Appl. No.: 09/249,671

[22] Filed: Feb. 12, 1999

[51] Int. Cl.[7] .................................................. A01D 19/00
[52] U.S. Cl. ..................... 56/16.8; 56/16.4 A; 56/16.4 D
[58] Field of Search ............................... 56/16.2, 16.4 D, 56/16.4 R, 16.4 A, 16.7, 16.8; 239/255, DIG. 6, 214

[56] References Cited

U.S. PATENT DOCUMENTS

| | | | |
|---|---|---|---|
| 2,878,633 | 3/1959 | Mullin | 56/16.8 |
| 2,936,563 | 5/1960 | Blume | 56/25.4 |
| 2,939,636 | 6/1960 | Mullin | 239/214.21 |
| 2,973,615 | 3/1961 | Yaremchuk et al. | 56/25.4 |
| 3,097,467 | 7/1963 | Konrad | 56/12.2 |
| 3,334,475 | 8/1967 | Danisch | 56/25.4 |
| 3,375,644 | 4/1968 | Harper | 56/25.4 |
| 3,477,212 | 11/1969 | Coffman | 56/25.4 |
| 4,926,622 | 5/1990 | McKee | 56/16.8 |
| 5,237,803 | 8/1993 | Domingue, Jr. | 56/16.8 |
| 5,813,122 | 9/1998 | Mubareka | 30/276 |

FOREIGN PATENT DOCUMENTS 625488   8/1961   Canada .

*Primary Examiner*—Robert E. Pezzuto
*Assistant Examiner*—Arpad Fabian Kovacs
*Attorney, Agent, or Firm*—Seidel, Gonda, Lavorgna & Monaco, PC

[57] ABSTRACT

A device for applying fluids such as fertilizers or insecticides or weed killers to vegetation clippings as the vegetation is being mulched by a lawn mulching mower. The treating fluid is applied to the vegetation clippings while they are being mulched, forming a protective fluid treated mulch blanket which can be directly distributed to the intended areas.

15 Claims, 7 Drawing Sheets

DEVICE FOR CREATING FLUID TREATED MULCH

FIELD OF THE INVENTION

This invention relates to a device for applying fluids such as fertilizers or insecticides or weed killers to vegetation clippings as the vegetation is being mulched by a lawn mulching mower, combining a step of fluid treatment with the mulching operation of a lawn mulching mower. The mulching action promotes the application of the treating fluid to the vegetation clippings, yielding fluid treated mulch which can be directly distributed as a fluid treated mulch blanket to the intended areas.

BACKGROUND OF THE INVENTION

Mulched vegetation clippings are used to promote the growth of other plants, by using decomposition of the mulched vegetation clippings as a nutrient for the plants. A fluid treated mulch blanket can be used as a protective barrier against insects when the fluid is an insecticide, or used to gradually provide nutrients to the underlying soil when the fluid is a fertilizer or to prevent the growth of weeds when using a weed killer. This invention is a device which, when used in conjunction with a lawn mulching mower, treats the mulch with a fluid and then discharges the mulch in the form of a fluid treated blanket of mulch.

SUMMARY OF THE INVENTION

In its broadest aspects, the invention is a device when used in conjunction with a lawn mulching mower produces fluid treated mulch. The device includes a fluid supply means to introduce a treating fluid into the cutting chamber of a lawn mulching mower above the blades of the lawn mulching mower, in which the mulched vegetation is mixed with the fluid to create mulched vegetation which is fluid treated. The lawn mulching mower is configured to recirculate grass clippings until they are mulched. The device, when used in conjunction with a lawn mulching mower, disperses the mulched clippings back over the swath of cut grass to form a fluid treated mulch blanket. The fluid supply means includes a reservoir to contain the treating fluid, at least one discharge port to introduce the treating fluid into the top of the cutting chamber above the cutting blade of the lawn mulching mower, and a fluid conduit tube to allow the treating fluid to flow from the reservoir to the at least one discharge port.

The invention allows the treating fluid to be applied to the mulched vegetation using the mulching action to promote the distribution of the treating fluid onto the mulched vegetation. Other advantages and essential details of the invention will become apparent from the subsequent description of preferred embodiments, the drawings, and the appended claims.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
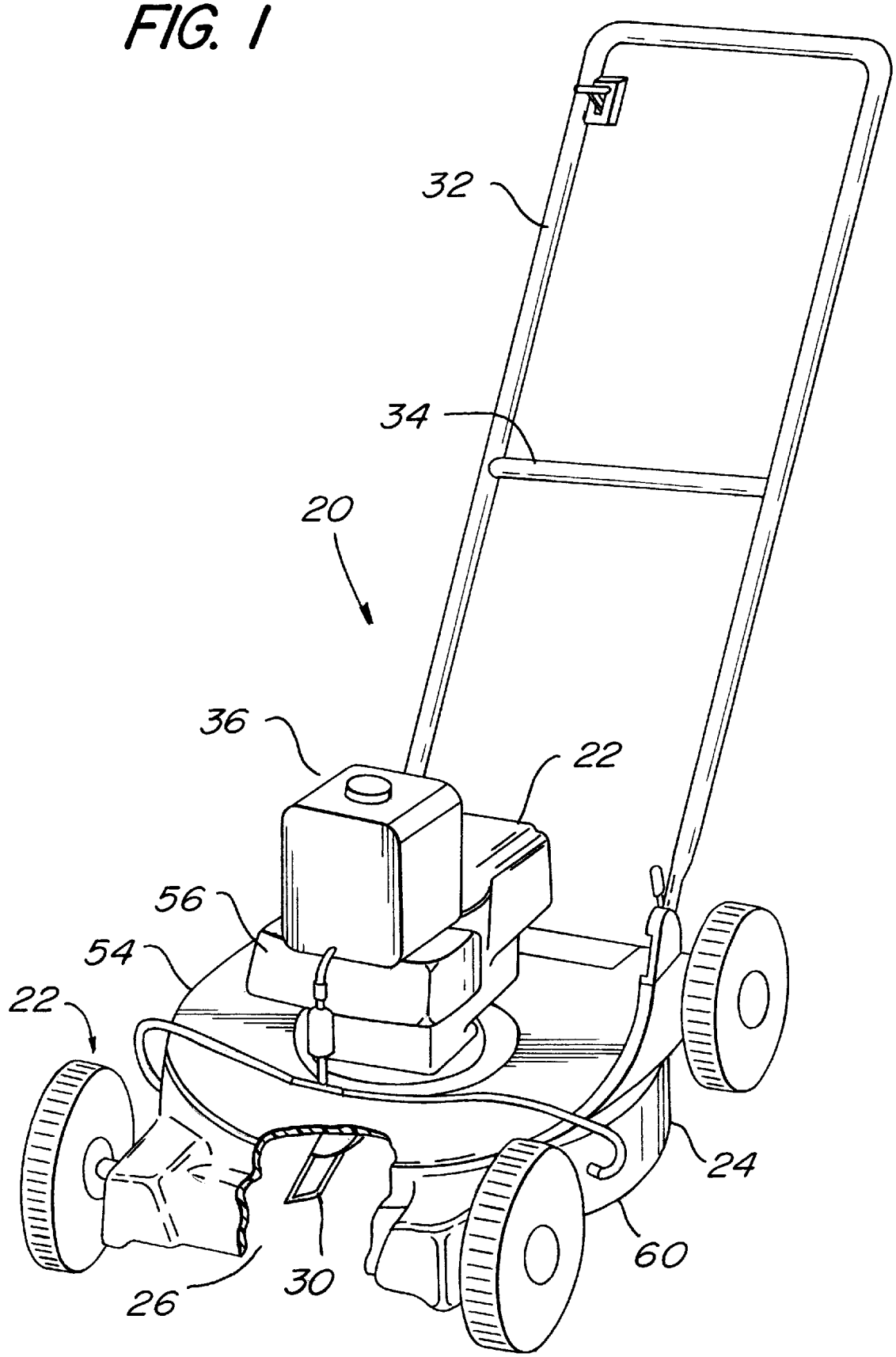
FIG. 1 is a perspective view of one form of apparatus according to the invention.

The invention will now be described with reference to the drawings wherein like numerals indicate like elements. Referring particularly to FIG. 1, numeral 20 generally indicates a lawn mulching mower designed to cut and re-cut grass clippings into fine parts before ejecting them. The invention in its preferred embodiment is applied to a lawn mulching mower, allowing the fluid treated mulch to be applied directly to a lawn to form a fluid treated mulch blanket, or collected for later dispersal if the lawn mulching mower is equipped to collect the grass clippings. Within the protective housing 24 of mower 20, a cutting blade 30 is turned by an engine or motor 28. The lawn mulching mower 20 is also generally equipped with a push handle 32. The fluid treating device of the invention comprises at least one fluid discharge port 60 which discharges into the protective housing 24, and a fluid reservoir 36 for holding a quantity of the treating fluid 52. The fluid reservoir 36 is preferably mounted closely adjacent to the engine or motor 28, such as on the motor housing. Although it is not preferred, the fluid reservoir may also be attached to the push handle 32. A fluid conduit 54 conducts liquid from the fluid reservoir 36 to fluid discharge port 60.

The fluid reservoir 36, shown in FIGS. 4–7, is preferably in the form of a chemically resistant tank which can be attached to the motor housing using any suitable fasteners. A preferred way of fastening the reservoir 36 to the motor housing is by cooperating strips of hook and loop fastener material, such as VELCRO®. The fluid reservoir 36 may thus be removed if desired, such as when it is desired to clean reservoir 36.

Figure 6:
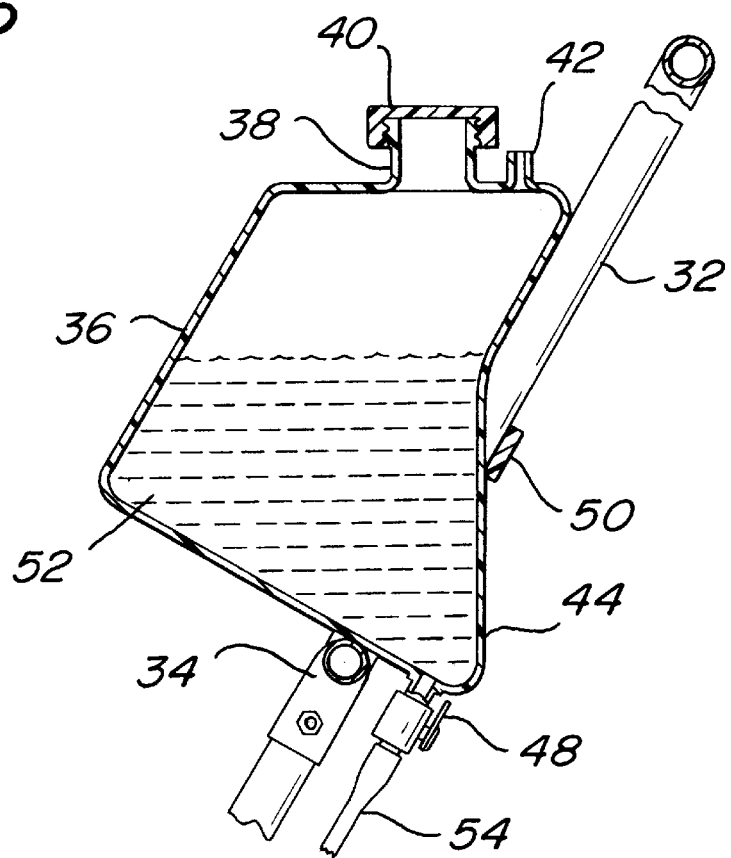
FIG. 6 is a side elevation in section of the fluid reservoir, mounted on a lawn mulching mower push handle.
Figure 7:
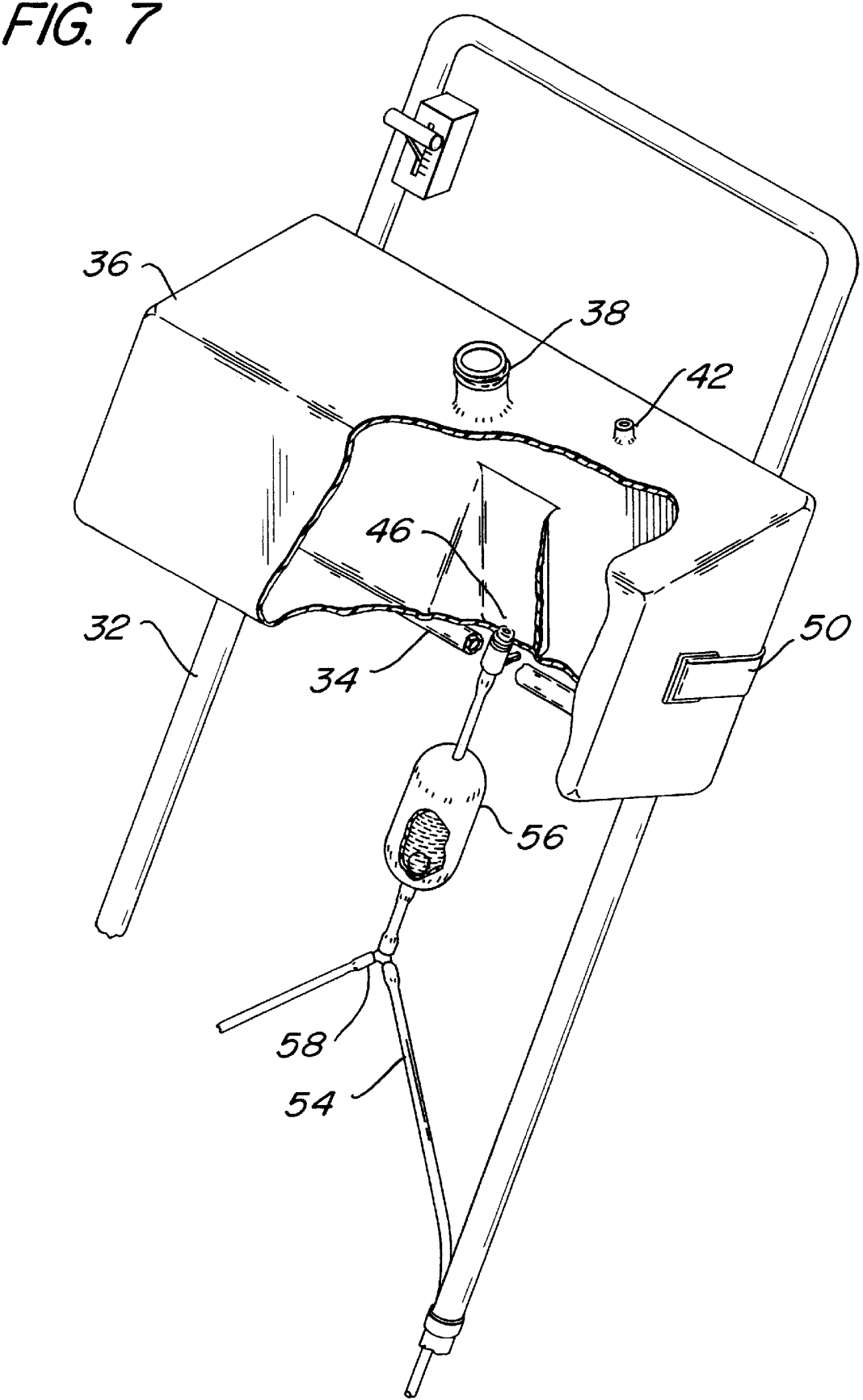
FIG. 7 is a perspective view, partially in section, of the lawn mulching mower push handle with the fluid reservoir mounted thereon, showing the placement of control valves.

Alternatively, the fluid reservoir 36 can be connected to the push handle 32 through the method described herein. This method uses a fluid reservoir 36 with a reservoir sump 44, such that the width of the reservoir tank spans the vertical elements of the push handle 32. The reservoir sump 44 is narrower than the vertical members of the push handle 32, and the reservoir sump 44 rests on the push handle cross bar 34 as illustrated in FIGS. 6 and 7. A reservoir strap 50 attaches to the ends of the fluid reservoir 36, and wraps behind the vertical elements of the push handle 32, holding the fluid reservoir 36 to the push handle 32. As some lawn mulching mowers use different push handle configurations, the mounting of the fluid reservoir 36 to the push handle 32 can be accomplished by any means consistent with the configuration of the push handle 32. While this method of attaching fluid reservoir 36 can be used, it is preferred to locate reservoir 36 on the motor housing.

A reservoir fill port 38 is located near the top of the fluid reservoir 36 and is closed by a reservoir fill cap 40, which can be removed to allow filling of fluid reservoir 36 with treating fluid 52. A reservoir vent 42 allows air pressure to equalize in the reservoir as the treating fluid 52 flows from the fluid reservoir 36 to the fluid discharge port or ports 60. The reservoir vent 42 can be alternatively located in the reservoir fill cap 40.

The fluid conduit 54 is preferably a flexible tube which is chemically compatible with the treating fluid 52. The fluid conduit 54 is connected at one end to the reservoir outlet port 46 and at its other end to the fluid discharge port or ports 60, as illustrated in FIG. 1. As shown in FIG. 7, the conduit is preferably connected to discharge port or ports 60 through a fluid flow control means 48, which may comprise a valve or other device designed to control the flow of treating fluid. The primary purpose of fluid flow control means 48 is to act as the main control valve to control the flow of fluid from reservoir 36. The fluid flow control means 48 may be a butterfly, ball, needle, or vibration valve, a pump, or a metering pump.

Figure 3:
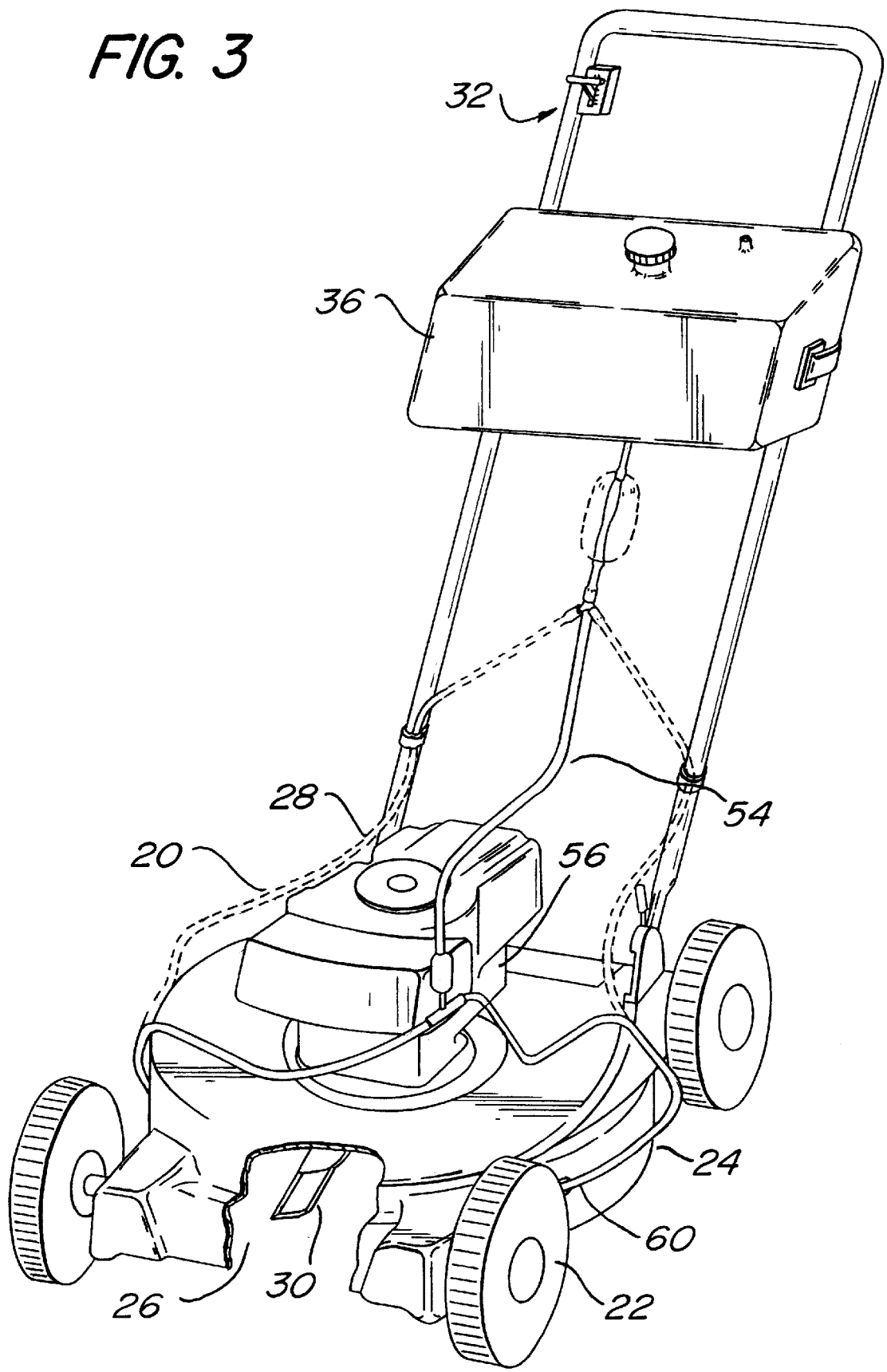
FIG. 3 is a perspective view of an alternate form of apparatus according to the invention.
Figure 4:
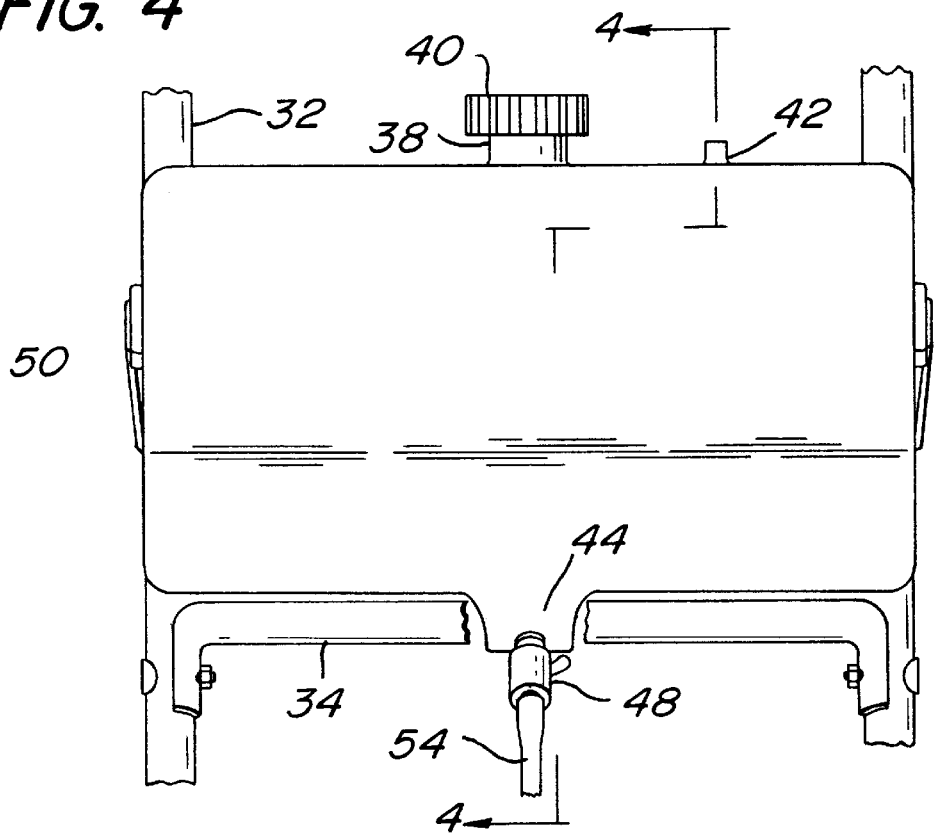
FIG. 4 is a front elevation of the fluid reservoir, showing a reservoir sump.
Figure 5:
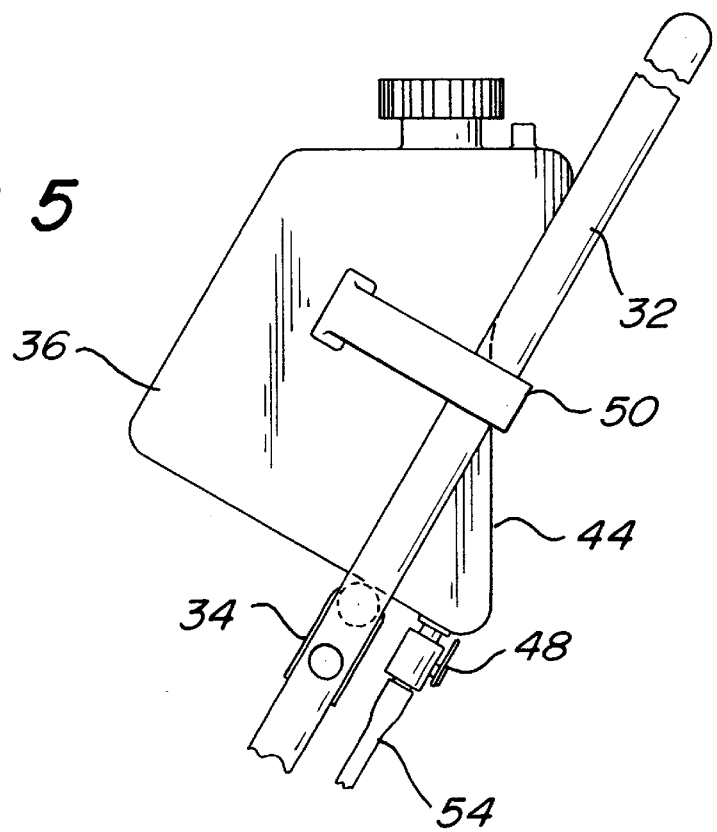
FIG. 5 is a side elevation of the fluid reservoir, showing the arrangement of the reservoir components.
Figure 8:
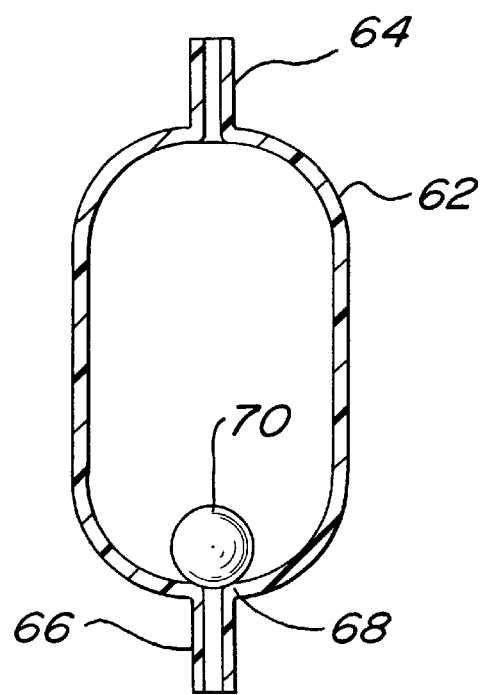
FIG. 8 is a sectional view of a vibration valve to control the flow of treating fluid.

The fluid conduit 54 may also be connected from the reservoir outlet port 46 to the fluid discharge port or ports 60 through a vibration valve 56, shown in FIG. 8, which permits the flow and regulation of treating fluid 52 to the fluid discharge port or ports 60 when the engine or motor 28 is operating and prevents fluid flow when the engine 28 is shut off. The vibration valve 56 comprises a flow chamber 62 with at least one inlet port 64 and at least one outlet port 66. Between the flow chamber 62 and the outlet port 66 is a valve seat 68, on which rests a control ball 70. The vibration created by the engine 28 causes the control ball to become displaced from the seat, allowing treating fluid 52 to flow past the valve seat 68 to the fluid discharge port or ports 60. The vibration valve 56 is preferably located near the engine or motor 28 such that the vibrations of the engine or motor 28 are effectively transmitted to the vibration valve 56, however additional constraints as known in the art may require locating the vibration valve 56 remotely from the engine on motor 28, as shown in phantom in FIG. 3.

The fluid conduit 54 may also branch into several paths to multiple fluid discharge ports 60 through a manifold. The preferred embodiment uses a y-fitting 58 to divide the flow of treating fluid 52 through the fluid conduit 54 into two branches, with each branch of the fluid conduit 54 feeding a separate fluid discharge port 60.

Figure 9:
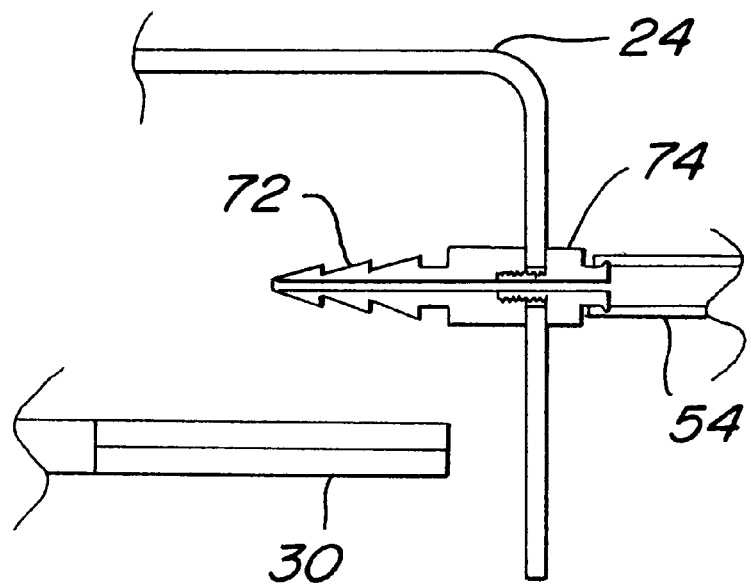
FIG. 9 is a partial section view of one embodiment of the fluid discharge port, shown mounted to the cutting chamber of the lawn mulching mower.
Figure 10:
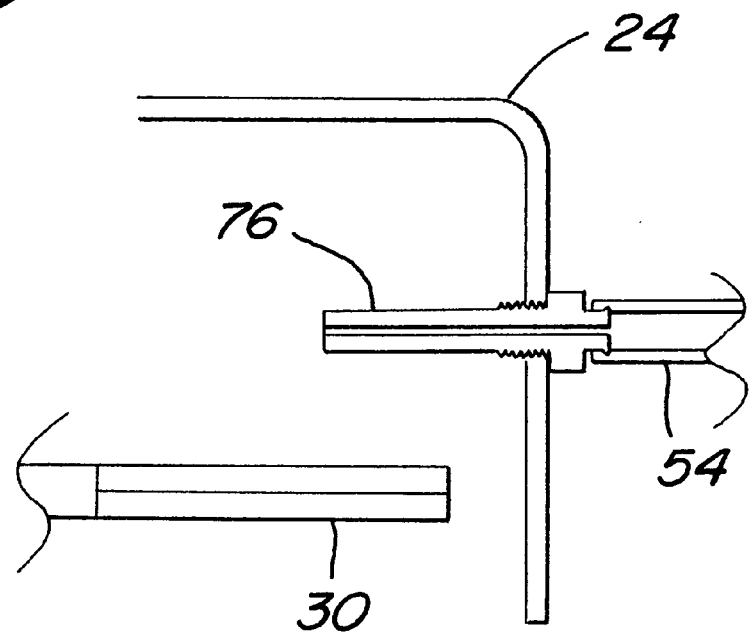
FIG. 10 is an alternate embodiment of a fluid discharge port.

The fluid discharge ports 60 introduce the treating fluid 52 into the mower cutting chamber 26 as shown in FIG. 9. A preferred embodiment of the discharge port or ports comprises two simple threaded adapter fittings, the interior fitting 72 comprising a female threaded fitting which connects to the outer fitting 74 through the protective housing 24 wall. The exterior fitting 74 receives the fluid conduit 54. The fluid discharge port or ports 60 preferably discharge the treating fluid 52 into the cutting chamber 26 a short distance from the rear wall of the protective housing 24, above the path of the cutting blade 30. An alternative embodiment uses a unitary fitting 76 as shown in FIG. 10., wherein the protective housing 24 is provided with a bore to accept the unitary fitting 76, which receives the fluid conduit 54.

The invention requires no more than a single discharge port 60, although multiple discharge ports may also be used. If a single discharge port is used, it is preferably located on the side of the protective housing 24 which permits maximum dispersal of the treating fluid onto the clippings. As the design and shape of the protective housings used on various mulchers will differ, it will be left to the judgment of those skilled in the art to determine the optimum placement of the single discharge port 60 on protective housing 24.

Figure 2:
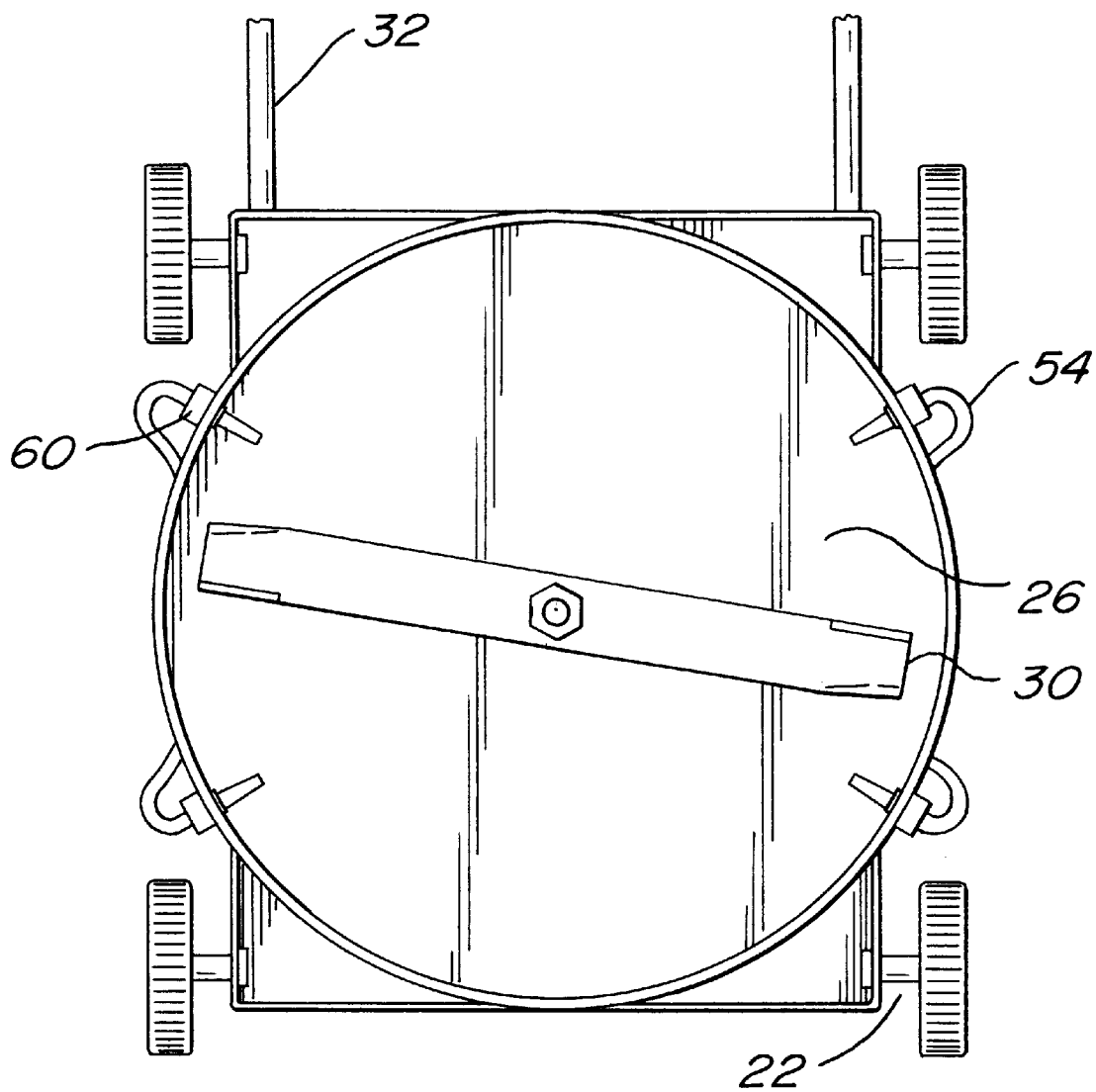
FIG. 2 is a bottom elevation of the lawn mulching mower showing the positioning of the fluid discharge port or ports relative to the lawn mower wheels.

While a single fluid discharge port 60 may be adequate with small mulchers, generally less than 24" diameter, the presence of a second fluid discharge port allows a higher flow rate of treating fluid 52 into the cutting chamber 26, and improves the distribution of the fluid throughout the mulchers. FIG. 2 shows, for illustrative purposes, four possible locations for the discharge port or ports 60. It should be understood that any number of discharge ports other than four can be used. Where multiple discharge ports are used, they may advantageously be located in the pockets formed by a tangent line L to the protective housing and parallel to the lawn mulching mower wheels 22 of the lawn mulching mower 20. This allows the exterior of the fluid discharge ports 60 to be shielded by the lawn mower wheels 22 from impact with objects while the mulching lawn mower 20 is in use.

From the foregoing description it will be apparent that the invention described herein provides a simple yet highly practical means for producing fluid treated mulch. In particular, the invention enables the transformation of vegetation into a fluid treated blanket of mulch. As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A device for producing fluid treated mulch from grass clippings, said device used in conjunction with a lawn mulching mower having a cutting chamber, an engine, a cutting blade and a handle extending upward from the lawn mulching mower, said device comprising a fluid supply means for introducing a treating fluid into the top of the cutting chamber above the cutting blade of the lawn mulching mower, said a means comprising a fluid reservoir and at least one discharge port, which opens into the cutting chamber above the cutting blade of the lawn mulching mower, said at least one discharge port being connected by a fluid flow path to said reservoir, said flow path being controlled by a control valve which automatically regulates the flow of the treating fluid from the reservoir to the at least one discharge port, said control valve being activated by the movement and vibrations of the lawn mulching mower to allow the treating fluid to flow from the reservoir to the at least one discharge port along the flow path which interconnects the reservoir, said control valve, and the at least one discharge port.

2. A device for producing fluid treated mulch from grass clippings as described in claim 1, wherein said lawn mulching mower is a closed deck lawn mulching mower, wherein the closed deck is shaped to form a cutting chamber and causes the grass clippings to become mulch, while said clippings are being fluid treated, by repeatedly chopping the grass clippings into successively smaller pieces until said mulch is distributed over a swath traversed by the lawn mulching mower.

3. A device for producing fluid treated mulch from grass clippings as described in claim 1, wherein said lawn mulching mower is a closed deck lawn mulching mower, wherein the closed deck is shaped to form a chopping chamber and causes the grass clippings to become mulch, while said clippings are being fluid treated, by repeatedly chopping the grass clippings into successively smaller pieces until said mulch is discharged through an exit opening.

4. A device for producing fluid treated mulch from grass clippings as described in claim 1, wherein said device includes a manually operated shut-off valve.

5. A device for producing fluid treated mulch from grass clippings as described in claim 4, wherein said manually operated shut-off valve is located along the fluid flow path at a point between the control valve and the reservoir.

6. A device for producing fluid treated mulch from grass clippings as described in claim 1, wherein said control valve comprises a valve body defining a flow chamber with at least one inlet port and at least one outlet port, at least one seat between the interior of the flow chamber and at least one outlet port, and a control ball in moveable engagement with said seat, such that said control ball is stable relative to the seat and said outlet port when the control valve is at rest and upset from the seat when the control valve is moved by movement and vibrations of the lawn mulching mower, allowing fluid present in the flow chamber to flow past the seat to the outlet port.

7. A device for producing fluid treated mulch from grass clippings as described in claim 6, wherein said control ball is stainless steel.

8. A device for producing fluid treated mulch from grass clippings as described in claim 6, wherein said control ball is coated with polytetrafluoroethylene.

9. A device for producing fluid treated mulch from grass clippings as described in claim 6, wherein the diameter of the control ball is chosen to control the rate of flow of fluid from the reservoir.

10. A device for producing fluid treated mulch from grass clippings as described in claim 6, wherein the valve body is made of separable first and second portions, which may be separated to permit replacement of the control ball.

11. A device for producing fluid treated mulch from grass clippings as described in claim 1, wherein said reservoir is removably attached to the lawn mulching mower.

12. A device for producing fluid treated mulch from grass clippings as described in claim 1, wherein said reservoir is attached to the engine of the lawn mulching mower.

13. A device for producing fluid treated mulch from grass clippings as described in claim 1, wherein said reservoir is attached to the handle of the lawn mulching mower.

14. A device for producing fluid treated mulch, said device used in conjunction with a lawn mulching mower having a cutting chamber, an engine, a cutting blade and a handle extending upward from the lawn mulching mower, said device comprising a fluid supply means for introducing a treating fluid into the top of the cutting chamber above the cutting blade of the lawn mulching mower, said means comprising a fluid reservoir, a manually activated shut-off valve and at least one discharge port which opens into the cutting chamber above the cutting blade of the lawn mulching mower, said at least one discharge port being connected by a fluid flow path to said reservoir and said flow path being automatically controlled by a control valve which regulates the flow of the treating fluid from the reservoir to the at least one discharge port, said control valve being activated by the movement and vibrations of the lawn mulching mower which allows the treating fluid to flow from the reservoir to the at least one discharge port along the flow path which interconnects the reservoir, said control valve, and the at least one discharge port.

15. A device for producing fluid treated mulch from grass clippings, said device comprising:
   a lawn mulching mower having a cutting chamber, and a cutting blade therein driven by an engine, and
   a fluid supply means for introducing a treating fluid into the cutting chamber, said fluid supply means comprising a fluid reservoir and at least one discharge port which opens into the cutting chamber above the cutting blade said at least one discharge port being connected by a fluid path to said reservoir, said flow path comprising a manually activated shut-off valve, a flow control valve which meters the flow of the treating fluid from the reservoir to the at least one discharge port, said control valve being induced to allow the treating fluid to flow to the at least one discharge port by the vibration of the engine, along the flow path which interconnects the reservoir, the manually activated shut-off valve, the vibration-activated control valve, and the at least one discharge port.

* * * * *